United States Patent
Saller (10) Patent No.: US 7,166,049 B2
(45) Date of Patent: Jan. 23, 2007

(54) VEHICLE DRIVE AND A CONTROL METHOD FOR A VEHICLE DRIVE

(75) Inventor: Michael Saller, Moosbach (DE)

(73) Assignee: AGCO GmbH, Marktoberdorf (DE)

( * ) Notice: Subject to any disclaimer, the term of this patent is extended or adjusted under 35 U.S.C. 154(b) by 202 days.

(21) Appl. No.: 11/024,001

(22) Filed: Dec. 28, 2004

(65) Prior Publication Data

US 2006/0142104 A1    Jun. 29, 2006

(51) Int. Cl.
F16H 3/72 (2006.01)
(52) U.S. Cl. ............................ 475/5; 475/207; 903/910
(58) Field of Classification Search .................. 475/1, 475/5, 151, 302, 207; 180/65.2, 65.4, 65.6; 903/909, 910, 911
See application file for complete search history.

(56) References Cited

U.S. PATENT DOCUMENTS

| | | | | |
|---|---|---|---|---|
| 5,571,058 | A * | 11/1996 | Schmidt | 475/5 |
| 5,856,709 | A * | 1/1999 | Ibaraki et al. | 290/45 |
| 6,991,053 | B2* | 1/2006 | Kuang et al. | 180/65.2 |
| 6,991,054 | B2* | 1/2006 | Takaoka et al. | 180/65.2 |
| 7,000,718 | B2* | 2/2006 | Adachi et al. | 180/65.2 |
| 2003/0178953 | A1* | 9/2003 | Tumback et al. | 318/8 |
| 2004/0251862 | A1* | 12/2004 | Imai | 318/376 |
| 2005/0115750 | A1* | 6/2005 | Takami et al. | 180/65.2 |
| 2005/0252703 | A1* | 11/2005 | Schmidt et al. | 180/65.2 |

FOREIGN PATENT DOCUMENTS

DE        19749074        5/1999

* cited by examiner

Primary Examiner—Charles A. Marmor
Assistant Examiner—Justin K Holmes
(74) Attorney, Agent, or Firm—Troutman Sanders, LLP; Gerald R. Boss

(57) ABSTRACT

A drive and a method to control the drive of an agricultural vehicle, especially of a tractor, is described. The drive includes a combustion engine (M) and an infinitely variable electro-mechanical torque split gear.

To avoid dissipation of reactive power the drive includes a shift gear (F) which has at least two input shafts (2, 3) each connected to at least one transmission step. Each of the at least two input shafts (2, 3) is in driving condition via a clutch (K1,K2) with a planetary gear (P1, P2) each with two inputs. The first input of each planetary gear (P1, P2) can be driven by a clutch (KV) from the driven shaft (1) of the combustion engine (M). The second input of each planetary gear (P1, P2) can be driven by a respective electric motor (S1, S2). At least one of the planetary gears (P1, P2) is designed to be locked-up.

The drive can be operated in pure electric mode, in electro-mechanical mode or in pure mechanical mode.

15 Claims, 5 Drawing Sheets

VEHICLE DRIVE AND A CONTROL METHOD FOR A VEHICLE DRIVE

The invention refers to a drive and a method to control the drive of agricultural vehicles, especially of a tractor, with a combustion engine, an infinitely variable electrical and mechanical torque split gear including a generator driven by the combustion engine, an electric motor to be driven by the generator, a microprocessor to control the number of revolutions, the torque and/or the direction of revolution of the electric motor, and a planetary gear having three shafts, wherein a first input of the planetary gear is connectable with the driven shaft of the combustion engine and second input of the planetary gear is driven in synchronism with the shaft of the electric motor, and a shift gear acts between an output of the planetary gear and a wheel drive of the vehicle.

A drive of the described type is known from DE 197 49 074 C2. In this design a first input of a planetary gear is always is in driving connection with the driven shaft of the combustion engine. There is no clutch between the combustion engine and the planetary gear. To stop the vehicle while the combustion engine is running it is therefore necessary to drive the second input of the planetary gear in the reverse direction with a number of revolutions sufficiently high that the output shaft of the planetary gear comes to a standstill. The number of revolutions of the second input is decreased to zero and afterwards increased in a forward direction to accelerate the vehicle in a forward driving direction. It is a disadvantage, that the drive in the whole speed region of backward driving and in the region of forward driving till reaching the 0-number of revolutions at the second input of the planetary gear shows a dissipation of power so that the mechanical power of the combustion engine cannot completely be used. Furthermore, the maximum speed of the vehicle in backward driving direction is lower than the maximum speed in forward driving direction, because the electric motor driving the second input of the planetary gear has to use part of its speed range to generate the standstill condition of the vehicle. The known drive also does not allow a pure mechanical operation if the electric motor fails. Also, in this known drive a purely mechanical device is provided for locking-up the planetary gear.

The known drive may be equipped with a shift gear to broaden the speed range of the vehicle. It is not known from the art how the shift gear should be designed. Shift gears of the art have the disadvantage that the change from the current transmission step to the next transmission step takes a certain time period. During this time the transmission ratio of the infinitely variable torque split gear has to be adapted to the transmission ratio of the next transmission step. To do this, the number of revolutions of the electric motor has to be decreased from its maximum value at the beginning of the change operation to a lower value. This needs a comparatively long time. Consequently, both of the clutches transferring torque act during the gear change operation. The result is corresponding wear of the clutches and jolting motion of the vehicle.

It is the object of the invention to provide an improved drive of the type described above.

This is achieved in the present invention by providing the shift gear with at least two input shafts each connected to at least one transmission step, each of the at least two input shafts being in driving condition with a respective planetary gear via a respective clutch, the first input of each planetary gear can be driven by a clutch from the driven shaft of the combustion engine and the second input of each planetary gear can be driven by a respective electric motor, and at least one of the planetary gears can be locked-up.

The invention starts from the premise of having a drive which can be controlled alternatively in pure electric mode, in pure mechanical mode or in electric and mechanical (electromechanical) mode. The speed range can be broadened due to the use of a shift gear having a plurality of transmission ratios. Normal shift gears or power split gears may be used as the shift gear. The time period needed to change the transmission step of such shift gears from the engaged transmission step to the next transmission step is very short, because it is possible to prepare the next transmission step by accelerating the input shaft of the next transmission step to the desired number of revolutions before the engaged transmission step is disengaged. The time period to prepare for the change in transmission step depends on the time the electric motor of the next transmission step needs to achieve a running condition in synchronism with the current transmission step this is controlled by a controller of the electric motor. The adaptation of the motor speed can be performed in a short period, because it is necessary only to accelerate or decelerate the rotor shaft of the electric motor. Thus the transmission step change occurs in a short time and without a jolting motion of the vehicle.

The pure electric mode to drive the vehicle is used to start the driving of the vehicle from rest, to avoid the loss of reactive power in the torque split gear at low speeds in the electro-mechanical mode. This is useful also for emergency cases in which the combustion engine has failed as the vehicle can be moved then out of dangerous areas by battery power. The driving torque can be doubled using both electric motors in parallel to overcome high torques required during starting of the vehicle from rest. Electric machines (generator and motors) are never used with zero revolutions during power split mode. Consequently, the thermal stress of electrical machines is well balanced and not very high with respect to the windings and the corresponding semiconductor power switch. Thus, electric machines having the same dimensions can be switched on to higher power settings and can be operated with a higher torque.

To reverse the driving direction, it is not necessary to pass through all of the lower transmission steps when coming from a higher transmission step to a standstill of the vehicle. Indeed, the vehicle can be decelerated in the currently engaged transmission step in electro-mechanical mode until it is possible to change to a pure electric mode, without using the clutches of the shift gear, in a time set by the selected transmission steps. It is possible to change the vehicle from the maximum forward speed to maximum reverse speed by reducing the number of revolutions and reversing the direction of rotation of the electric motor in use.

The features of claims 3 and 4 allow a change of the transmission step or ratio without interrupting torque transfer or with a low interruption of torque transfer respectively, because the clutches can be operated in overlapping mode. The clutches can be operated in overlapping mode even if there is no synchronism to effect quick changes of transmission steps, e.g. for ABS control, antiskid control. Deviations from synchronism are balanced. Without the use of power shift clutches a change in torque split transfer from the electro-mechanical mode to the pure electric mode or vice versa without overlapping is only possible when having of a constant number of synchronous revolutions. Using power shift clutches a change with overlapping is possible even with a varying number of revolutions without interrupting power transfer.

The region of overlapping between the transmission steps I to IV according claim 5 makes it possible to change the transmission step without interrupting power transfer and without interrupting overlapping so that loss due to friction is avoided. The efficiency remains high during a change of the transmission step.

The self centring of the sun wheel is easily designed due to the coaxial arrangement of the electric motor and the planetary gear. Otherwise, an additional tooth gear is needed to locate the sun gear.

The primary electrical machine (generator) has to be adapted to transfer the entire power of the combustion engine so that the entire installed power can be used by other consumers. As far as secondary machines (motors) are concerned there are two possibilities according claims 7 and 8:

For maximum efficiency it is desirable to transmit only a small part of the total power of the vehicle electronically. Comparatively low cost small electric motors are therefore theoretically sufficient. However, if small motors are used, a larger number of transmission steps is needed to achieve the same overall transmission range. Designing the drive there are two possibilities: All of the electric machines in form of a generator and two electric motors are adapted at least to the nominal power of the combustion engine to minimize cost. This results in large electric motors in connection with a shift gear with a low number of transmission steps. However, if the drive has to have high efficiency, it is useful with the arrangement of one generator and two electric motors if the sum of the nominal power of the electric motors is equivalent to the nominal power of the combustion engine.

Pure electric operation is possible using two electric motors with the sum of the nominal power of the electric motors equivalent to the nominal power of the combustion engine. Consequently, the entire installed power can be used for driving.

According to the feature of claim 9 all of the electric machines are to be operated in the forward and reverse directions and to function as a motor or generator. In the overrun condition the electric machines operate with low efficiency so that the braking moment of the combustion engine is intensified by the low efficiency.

According to claim 10 the electric machines are permanent magnet synchronous machines having a high power density and a small mass moment of inertia which allows the direction of drive to be reversible easily.

According to claims 11 and 12 the arrangement of the electric motors in a separate housing and on a common platform is advantageous with respect to the separation of the motors to protection against electrical shocks and short circuits. The use of clutches provides the separation of the electric motors from the rest of the drive gear. The described arrangement also facilitates accessibility for maintenance purposes as the parts can be demounted as one unit.

The reverse step according claim 14 gives a useful improvement of efficiency during driving in a reverse direction.

Claim 15 is directed to a method for controlling the drive when changing between an electrical step driven by one of the electric motors and an electro-mechanical step driven by the engine and one of the motors. The vehicle may thus be accelerated without interrupting the acceleration. The overlapping region of engagement of the clutches can be used as a region of synchronism.

By way of example, one embodiment of the invention is described with reference to the accompanying drawings in which.

Figure 1:
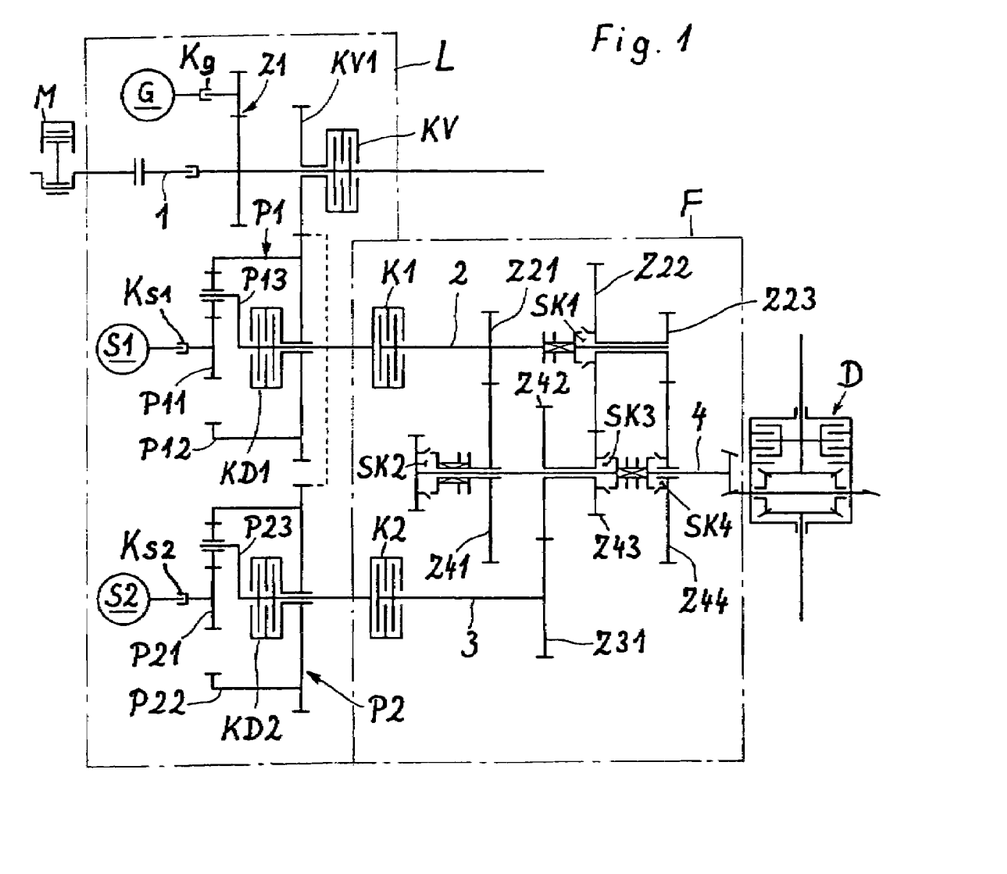
FIG. 1 shows a schematic representation of an infinitely variable electro-mechanical change-speed drive of the invention suitable for a tractor.

The inventive drive for a tractor shown in FIG. 1 includes a combustion engine M, an infinitely variable electric/mechanical torque split gear L and a shift gear F driving directly the wheels of a vehicle (not shown) via a differential gear D.

The torque split gear L contains a primary electric machine and two secondary electric machines which may be used as a generator or as a motor according to the operating condition of the vehicle. In normal use during forward driving of the vehicle the primary electric machine is used as a generator G and the two secondary electric machines are used as electric motors S1 and S2. In the overrun condition of the vehicle the generator is used as an electric motor and the electric motors as generators.

The generator G is driven by the driven shaft 1 of the combustion engine M via gear train Z1. The electric power of the generator is equivalent to the power output of the combustion engine. A microprocessor splits a part of the power of the combustion engine M in form of electric energy. This energy is used to drive the electric motors S1 and S2 of an infinitely variable power split gear or other consumers on the vehicle. The number of revolutions, the torque and the direction of drive of the motors are controlled by the microprocessor. The power output of the electric motors S1 and S2 is matched with the power output of the combustion engine M.

Furthermore, the torque split gear L includes two planetary gears P1 and P2 containing three shafts forming two inputs and one output. Both of the planetary gears P1 and P2 serve to add up the mechanical power transmitted by the clutch KV from the combustion engine M and the drive shaft 1 and the electric power transmitted by the electric motors S1 and S2. Consequently, in this embodiment, the electric motors S1 and S2, (the electric power inputs) are directly coupled to the sun wheels P11 and P21 respectively, while the inputs of the mechanical parts of the power are received by the ring gears P12 and P22 respectively. Both ring gears have outer teeth meshing with the toothed gear KV1 which forms part of the clutch KV. The planet carriers P13 and P23 respectively serve as outputs. The ring gears P12 and P22 may be connected with the planet carriers P13 and P23 respectively by clutches KD1 and KD2 to brake (lock-up) the planetary gears P1 and P2.

The torque split gear L is followed by a shift gear F having two input shafts 2 and 3 and one output shaft 4 connected to the differential gear D of a vehicle (not shown). Both input shafts are arranged in parallel and coaxial to an output shaft of each of the planetary gears P1 and P2. The transmission of power through shift gear F can be closed or opened by clutches K1 and K2. The input shafts 2 and 3 and the output shaft 4 carry toothed gears Z21, Z22, Z23, Z31, Z41, Z42, Z43, Z44 and synchronising couplings SK1, SK2, SK3 and SK4, each of them being connected to their associated shaft so as to rotate with that shaft. Consequently, a plurality of overlapping transmission steps I to IV generating a range of driving speeds is provided. The input shaft 3 is allocated to the transmission steps I and III. The input shaft 2 is allocated to the transmission steps II and IV.

Figure 2:
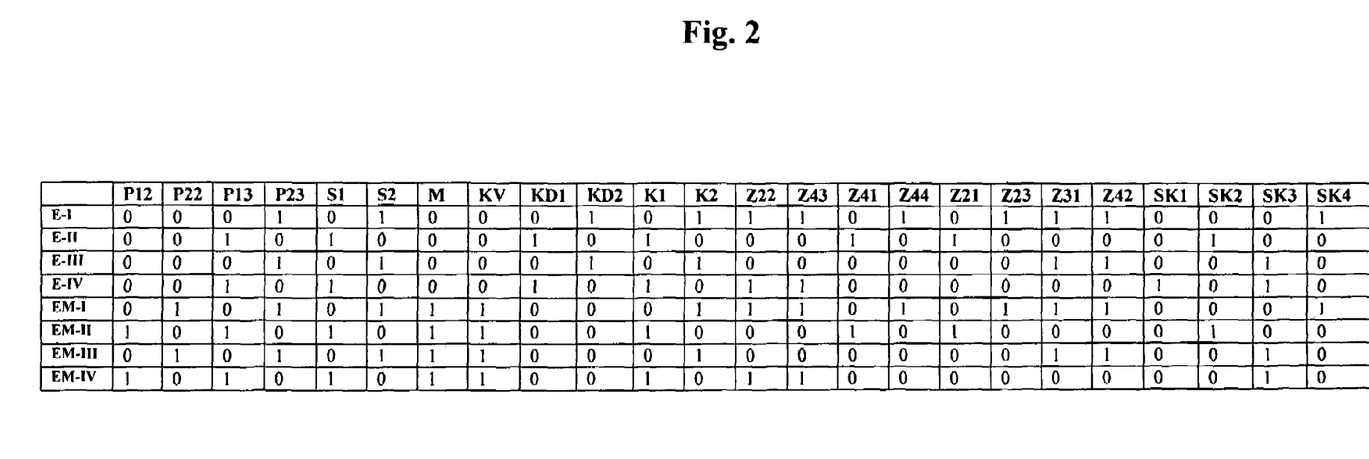
FIG. 2 shows a diagram of the transmission steps of the drive according FIG. 1.

The diagram of the different transmission steps E-I to E-IV and EM-I to EM-IV of the drive according FIG. 2 shows which clutches and toothed gears are active in the path of power. In FIG. 2 the symbol '0' means that the respective element (clutch, toothed gear) is inactive whilst the symbol '1' means that the respective element (clutch, toothed gear) is active. The ratios of the pairs of the toothed gears are designed in a manner so that the input shafts 2 and 3 are used alternately as successive ratios are engaged in the transmission. This known procedure results in a change in the path of power alternately from electric motor S1 or electric motor S2.

Figure 3:
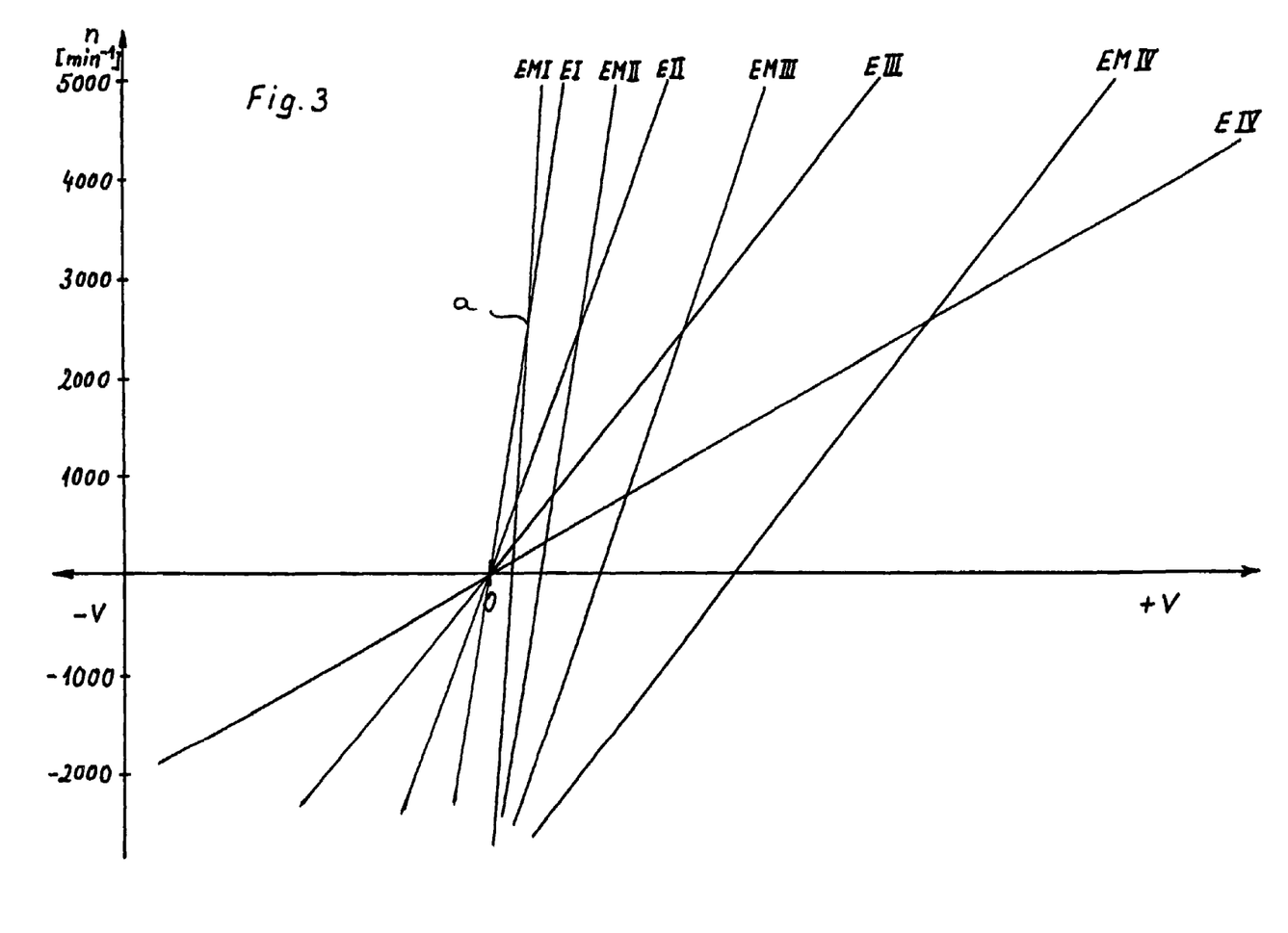
FIG. 3 shows a diagram of the characteristic lines of the possible speeds of the transmission steps with respect to the number of revolutions of the drive.

FIG. 3 shows the possible driving speeds (v) according the transmission steps E-I to E-IV and EM-I to EM-IV with respect to the number (n) of revolutions of the electric motor S1, S2 powered with electricity. Transmission steps designated with an 'E' denote transmission steps during a purely electric operation. Transmission steps designated with an 'EM' denote transmission steps during combined electric and mechanical (electro-mechanical) operation. The transmission steps 'EM' are designed and arranged to overlap each other to avoid driving conditions causing dissipation of reactive power. The characteristic line of the transmission step 'EM-I' shows that driving speeds below about 40% of the maximum driving speed of this transmission step can be used but lead to a serious loss of driving torque by dissipation. Consequently, starting the drive of a vehicle from rest is always performed by use of purely electric operation using the characteristic line E-I up to an operation point 'a' fixed by the intersection of characteristic lines E-I and EM-I. At this operation point there is a transition from line E-I to EM-I, i.e. from purely electric operation to the combined electromechanical operation. Consequently, the vehicle is driven through the whole range of the speeds provided by the transmission step I in an efficient manner.

The drive of the invention can be operated in the following modes alternatively:
1. Pure electrical operation E-I to E-IV without adding mechanical split power from engine M.
2. Electro-mechanical operation with EM-I to EM-IV with electric and mechanical split power.
3. Pure mechanical operation without adding split power.

Operating Mode 1:

As mentioned above, this mode of operation is useful to start the driving of a vehicle from rest and during very low speeds in the transmission step I. Starting the drive of a vehicle in the transmission step E-I and changing into the transmission step E-II is done as follows:

Clutch KV is released to interrupt the mechanical branch of the power split gear L. Clutch KD2 is closed to direct the torque of the electric motor S2 directly to the shift gear F. KD1 is opened in order to keep the mass of electric motor S2 and driven elements low. Consequently, electric motor S2 acts on the shift gear F through the closed clutch K2. The synchronising couplings SK1, SK2 SK3 are open and the synchronising coupling SK4 is closed to provide a power transmitting path via the toothed gears Z31, Z42, Z43, Z22, Z23 and Z44 to the differential gear D. The electric motor S2 is fed electricity and the vehicle starts to move. The maximum number of revolutions of the electric motor S2 results in a maximum speed of about 8 km/h forward or backward depending on the direction of revolution. Transmission step II of the shift gear F is prepared for engagement by closing of the synchronising coupling SK2 during reaching of this maximum speed. The synchronising coupling SK4 is opened. The electric motor S1 is fed electricity and accelerated up to the number of revolutions of the input shaft 2. Then, the clutch K2 is opened during closing of clutch K1 at the same time. A change into the other transmission steps E-III and E-IV is analogously performed using the active components indicated in FIG. 2.

Thus when transmission step E-III is active motor S2 drives differential D via clutches KD2, K2, gears Z31,Z42 and coupler SK3. Similarly when transmission step E-IV is active motor S1 drives differential D via clutches KD1, K1, gears Z22, Z43 and coupler SK3.

Operating Mode 2:

The vehicle has to be started in accordance with the purely electrical operating mode 1 described above before beginning the operating mode 2 which is an electro-mechanical torque split operation.

As soon as the vehicle has reached the speed of the intersecting point 'a' of the characteristic lines 'E-I' and 'EM-I' in FIG. 3 all parts of the drive rotate in synchronism (this is ensured by choosing the appropriate gear ratios). Opening of the clutch KD2 unlocks of the planetary gear P2 and the clutch KV is closed to deliver mechanical power to the torque split gear L via gears KV1 and P22. Increasing the number of revolutions of the electric motor S2 in the torque split mode results in an increase of the driving speed up to a maximum level according the characteristic line EM-I of FIG. 3. Transmission step EM-1 uses the power train of step E-1 from motor S2 to differential D (see FIG. 2) plus the mechanical power input into planet gear P2 via ring gear 22 and gear KV1.

Now, a change to the transmission step EM-II is possible. This occurs in accordance with the operation steps of the elements listed in FIG. 2. During the change in to the next transmission step it is important to close the synchronising coupling SK2 of the toothed gear Z41 in preparation for the transmission step II. Coupling SK2 is closed when the speed of motor S2 reaches a predetermined limit (e.g. 90% of its maximum nominal speed). Should the number of revolutions of the electric motor S2 decrease below this predetermined limit by a predetermined amount without a change of the transmission step taking place, then the synchronising coupling SK2 is opened to avoid an unnecessary loss of energy by an unnecessary change to transmission step EM-II.

Typically the gearing of adjacent transmission steps is arranged so that, for example when motor S2 is reaching its maximum rated speed (e.g. 5000 r.p.m.), an change to a transmission step powered by motor S1 is required, motor S1 is rotating at 10% of the rated maximum speed (e.g. 500 r.p.m.). Thus with motor S2 rotating at 5000 r.p.m. and motor S1 rotating at 500 r.p.m. the speed of shaft 2 upstream of clutch K1 approaches the speed of shaft 2 downstream of clutch K1 and the motors are said to be operating in synchronism. During this synchronisation of motors S2 and S1, motor S2 continues to be powered so there is no loss of motive force for the vehicle.

When the speeds of the motors are synchronised, as described above, during a certain time interval the clutch K1 is closed. The synchronising coupling SK4 of the toothed gear Z44 is opened as soon as the number of revolutions of the electric motor S1 overrides a lower limit (about 20% of its nominal maximum speed). Thus, the transmission step EM-II is fully active in which the powertrain of step EII from motor S1 to differential D (see FIG. 2) plus the mechanical power input into planet gear P1 via ring gear P12 and gear KV1 is used.

Where possible it is desirable to operate in the electromechanical transmission steps EMI to EMIV since these steps are more efficient then the purely electrical steps EI to EIV since steps EMI to EMIV transmits part of their torque mechanically from engine M which is inherently more efficient. Thus typically the vehicle is started in step EI as described above, and then operated in steps EMI to EMIV after the synchronism point 'a' of curves EI and EMI has been attained. Upward changes between the other transmission steps are achieved using the active elements set out in FIG. 2.

When changing down (for example from EMII to EMI) if the speed of motor S1 has dropped to say 20% if its nominal maximum speed (e.g. has drop to 1000 r.p.m.) then preparation is made to change down thus coupler SK4 is engaged and motor S2 is synchronised by increasing its speed up to its maximum rate speed (e.g. 5000 r.p.m.) as K2 is engaged and K1 disengaged. If during such a down change the speed of motor S1 increases say to a predetermined value (e.g. 40% of its maximum rated speed—e.g. 2000 r.p.m.) the down change us cancelled. This down change philosophy is used between all the 'EM' steps.

During the change of a transmission step, whether to a higher or lower transmission ratio, power shift transmissions can show an unpleasant stick-slip motion. This is the reason for a new method of controlling the clutches of the drive in accordance with the present invention. The new method which is used to control the clutches KV, KD1 and KD2 avoids not only unpleasant stick-slip motion but makes possible changes of transmission ratio not only without interrupting the tractive power but also without interrupting the acceleration of the vehicle. The inventive infinitely variable drive of the present invention with its stepped shift gear thus functions like known infinitely variable drives without stepped shift gears and has the same speed range.

The new method is based on the idea that a change of gear of a power shift transmission needs a definite time duration to accomplish the change. This time duration is composed of the time needed to build up pressure in the clutch of the transmission step which is to be engaged and the time needed to decrease the pressure in the clutch of the transmission which is already engaged. The required time duration to make the change can be determined by experiment or during use as a fixed parameter depending on the load imposed. This is done by sensing and evaluating several parameters set by the driver of the vehicle or the vehicle itself, e.g. the desired acceleration, the number of revolutions of the combustion engine, the position of the foot pedal, the driving speed etc. A microprocessor evaluates a change (nd) in the number of revolutions of the engine which depends on the needed time duration for the change and the desired change in ratio. This change in engine speed is divided in two to give the number of revolutions at the point of synchronism 'SP', as can be seen from FIG. 4. The point X in time, is the beginning of the overlapping operation in which the currently operative clutch begins to open and the newly operative clutch begins to close. Regarding a change from a transmission step 'E' to a transmission step 'EM' with an increasing characteristic line K (see FIG. 4) up to point X either clutch KD1 or KD2 is engaged and after point Y clutch KV is engaged. Regarding a change from a transmission step 'EM' to a transmission step 'E' with a decreasing characteristic line K (not shown), up to a point X clutch KV is engaged and after a point Y either clutch KD1 or KD2 is engaged. Thus when changing from step E1 to EM clutch KD2 is disengaged whilst clutch KV is engaged and the speed of shaft 1 is synchronised with the drive from motor S2 via clutch KV. Similarly, when changing from step EM1 to step E1 clutch KV is disengaged and clutch KD2 is engaged and the drive is synchronised in clutch KD2 which locks-up planet gear P1.

Figure 4:
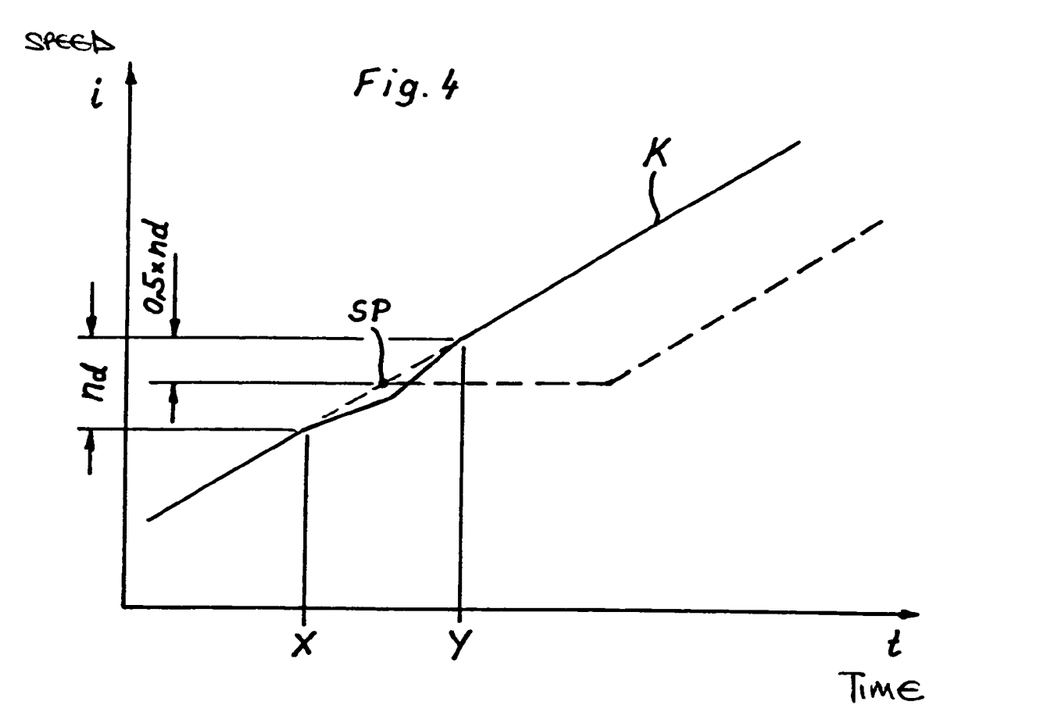
FIG. 4 shows a diagram of the variation of the engine speed with respect to the time during change of a gear step in a transmission according to the invention.

FIG. 4 shows also that the characteristic line K of the change of the engine speed during this operation compared to a characteristic line of a known arrangement (shown in a dotted line) shows nearly no influence with respect to the point of synchronism SP, i.e. the acceleration of the vehicle is practically uninterrupted.

This method of operation is necessary only when a change has to be achieved at a point of synchronism, e.g. in a drive change from purely electrical operation to electro-mechanical operation or vice versa, where there is no overlapping.

In shifts between adjacent electro-mechanical ('EM') steps this method of operation is not necessary because the speed of electric motors S1 and S2 is adapted to the desired acceleration of the vehicle for a change of the transmission step with overlapping. It is possible to keep both clutches closed for a period of time during a change, as described above, so that no variation of the acceleration occurs and a stick-slip motion is avoided.

When it is desired to drive the vehicle in reverse [and the vehicle is operative in an electro-mechanical ('EM') step] a change is made to the nearest purely electrical ('E') step and the speed of the operative motor reduced to bring the vehicle speed to zero followed by increasing the operative motor in the reverse direction until the desired reverse speed of the vehicle is achieved.

Thus, referring to FIG. 3, if the vehicle is operating in step EM2 and it is desired to drive the vehicle backwards, the drive is changed into step E2. This step E2 is then used to show the vehicle to rest and accelerate the vehicle in the reverse direction until the desired reverse speed is obtained.

Operating Mode 3:

The pure mechanical operation mode is provided for emergency condition in which the electrical part of the torque split gear L fails and the vehicle cannot be moved in accordance with the operation modes 1 or 2. In this emergency condition the vehicle can be moved by the use of the clutches K1 or K2 in two speed regions.

The vehicle drive described above can be simplified, if desired, by eliminating one of the lock-up clutches KD1 or KD2. Thus, for example, if clutch KD1 were to be eliminated only the purely electrical steps E1 and E3 would be available but all the electro-mechanical steps EMI to EMIV would still be available. This simpler and therefore cheaper configuration would still allow the vehicle to start from rest in step E1 and then operate after the synchronisation point 'a' of FIG. 3 in the most appropriate step EM1 to EMIV.

Figure 5:
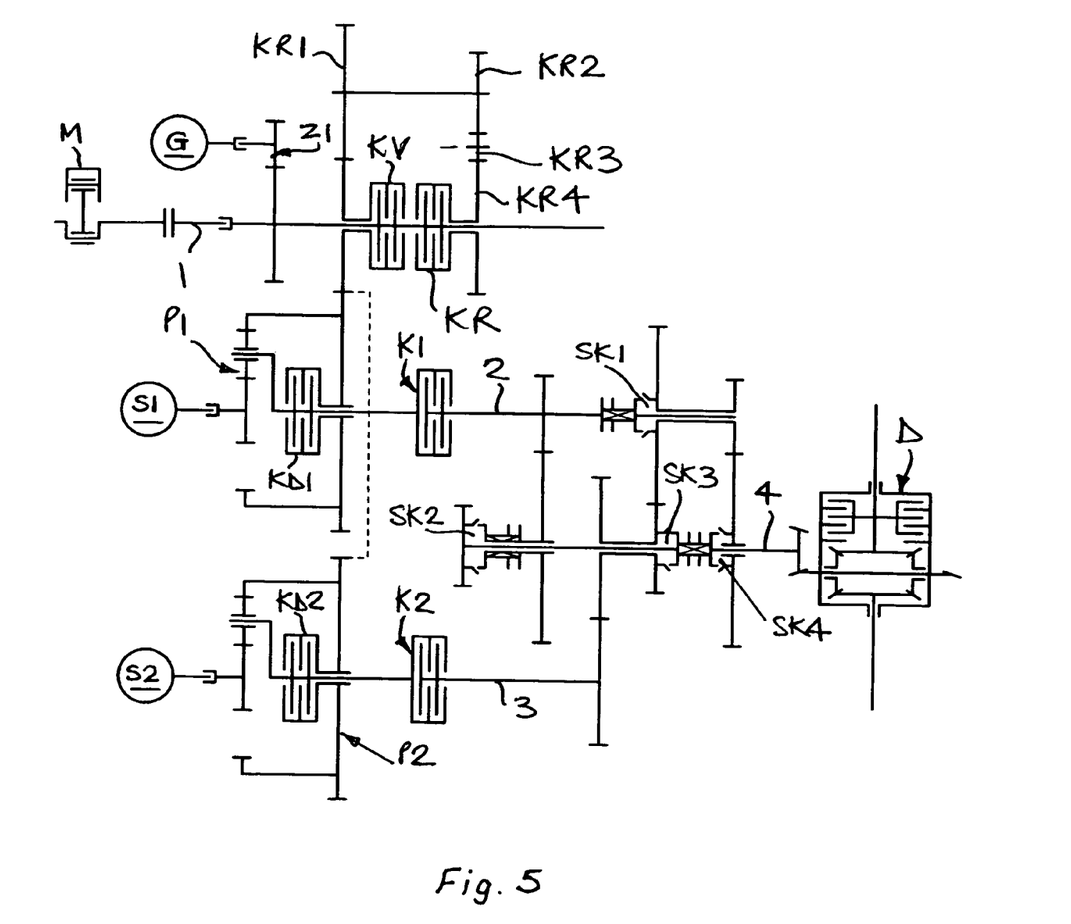
FIG. 5 shows a modified form of drive in accordance with the invention.

The vehicle drive can also be modified, as shown in FIG. 5, to provide electromechanical reverse drive steps by adding the reverse drive gear train KR1, KR2, KR3 and KR4 driven from gear KV1 and the reverse drive clutch KR which enables engine M to provide drive in the reverse direction in combination with either motor S1 and S2 to give four electro-mechanical reverse drive ratio equivalent to the forward drive ratios EM1 to EMIV. This provides a more efficient reverse drive arrangement than a purely electric reverse drive.

The invention claimed is:

1. A drive of an agricultural vehicle, with a combustion engine (M), the drive comprising an infinitely variable electrical and mechanical torque split gear (L) including a generator (G) driven by the combustion engine, electric motors to be driven by the generator, a microprocessor to control the number of revolutions, the torque and/or the direction of revolution of the electric motors, planetary gears each having three shafts, wherein a first input of each planetary gear is connectable with the driven shaft of the combustion engine and a second input of each planetary is driven in synchronism with the shaft of an associated electric motor, and a shift gear (F) acting between outputs of the planetary gears and a wheel drive of the vehicle, the shift gear (F) having at least two input shafts (2, 3) each connected to at least one transmission step, each of the at least two input shafts (2, 3) being in driving connection with a respective planetary gear (P1, P2) via a respective clutch (K1, K2), the first input of each planetary gear (P1, P2) being driveable by a clutch (KV) from the driven shaft (1) of the combustion engine (M) and the second input of each planetary gear (P1, P2) being driveable by a respective electric motor (S1, S2), and at least one of the planetary gear (P1, P2) being designed to be locked-up.

2. The drive of claim 1 in which both planetary gears (P1,P2) are designed to be locked-up.

3. The drive of claim 1 in which the shift gear (F) is designed to have transmission steps so that when changing between adjacent transmission steps (I, II, III, IV) power is transmitted alternately by the input shafts (2, 3) in turn.

4. The drive of claim 1 in which the shift gear (F) is a power shift transmission.

5. The drive of claim 1 in which that the transmission steps (I, II, II, IV) are designed and arranged so that an overlapping region is arranged between two adjacent transmission steps.

6. The drive of claim 1 in which the electric motors (S1, S2) are coaxially arranged with respect to the associated planetary gears (P1, P2).

7. The drive of claim 1 in which the generator (G) and two electric motors (S1, S2) are each adapted to transmit the nominal power of the combustion engine (M).

8. The drive of claim 1 with the arrangement of one generator (G) and two electric motors (S1, S2) in which the sum of the nominal power of the electric motors (S1, S2) is equivalent to the nominal power of the combustion engine (M).

9. The drive of claim 1 in which all of the electric machines are designed to be operated in the forward and reverse directions and to function as a motor or generator.

10. The drive of claim 1 in which the generator (G) and the motors (S1, S2) are permanent magnet synchronous units.

11. The drive of claim 1 in which a sun wheel (P11, P21) of each respective planetary gear (P1, P2) is in driving connection with the driven shaft of a respective electric motor (S1, S2) by a respective clutch (Ks1, Ks2).

12. The drive of claim 1 in which the generator (G) and motors (S1, S2) are arranged on a common platform which is arranged to be inserted and taken out of the housing of the torque split gear (L) as a unit and rotor shafts of each of the generator (G) and motors (S1, S2) are connected with their associated components (Z1, P11, P21) of the torque split gear (L) by electrically isolating a respective clutch attached to each of said rotor shafts (Kg, Ks1, Ks2).

13. The drive of claim 2 in which ring gears (P12, P22) of the planetary gears (P1, P2) are designed to be locked with respective plant carriers of said planetary gears (P13, P23) to lock-up the planetary gears.

14. The drive of claim 1 in which a clutch (KR) and a reverse drive step (KR1,KR2,KR3,KR4) is arranged between a driven shaft (1) of the combustion engine (M) and the torque split gear (L) to increase efficiency in the reverse drive direction by providing electro-mechanical reverse drive step.

15. A method for controlling the drive of claim 1, when changing between an electrical step (EI to EIV) driven by one of the electric motors (S2,S2) and an electromechanical step (EMI to EMIV) driven by engine M and one of the motors (S1,S2), in which during a change from the current transmission step to the next transmission step the opening of the currently operative clutch (KD1 or KD2:KV) of the current transmission step and the closing of the newly operative clutch (KV:KD1 or KD2) for the new transmission step are both started a preset number of revolutions of the engine (0.5*nd) before a synchronous rotation (SP) of the inputs into the newly operative clutch (KV:KD1 or KD2) and, in which during the change the speed of the currently operative electric motor (S1,S2) is continuously changing so that the acceleration of the vehicle in not interrupted, wherein the present number of revolutions depends upon parameters set by the driver, said parameters being a level of acceleration, a number of revolutions of the combustion engine, a position of a foot pedal, or a speed of the vehicle.

* * * * *